UNITED STATES PATENT OFFICE.

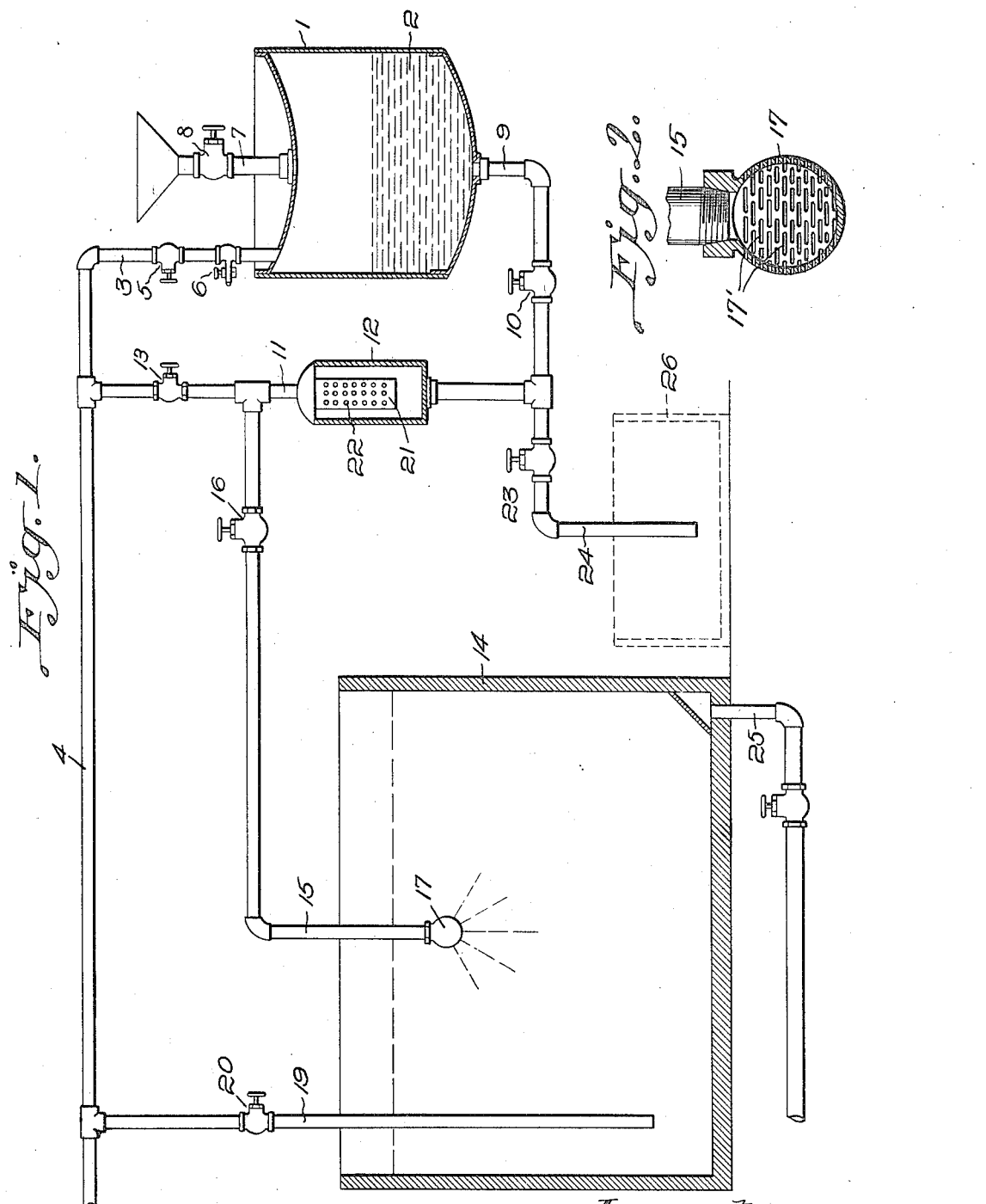

BRUNO KNIFFLER, OF WINCHESTER, AND WILLIAM A. OPPEN, OF STONEHAM, MASSACHUSETTS.

APPARATUS FOR PREPARING RESIN SIZE FOR PAPER MANUFACTURE.

1,215,034.

Specification of Letters Patent.

Patented Feb. 6, 1917.

Original application filed February 5, 1914, Serial No. 816,860. Divided and this application filed September 14, 1914. Serial No. 861,580.

*To all whom it may concern:*

Be it known that we, BRUNO KNIFFLER and WILLIAM A. OPPEN, both citizens of the United States, and residents of Winchester and Stoneham, respectively, in the county of Middlesex, State of Massachusetts, (whose post-office addresses are Stoneham, Massachusetts,) have invented an Improvement in Apparatus for Preparing Resin Size for Paper Manufacture, of which the following description, in connection with the accompanying drawings, is a specification, like characters on the drawings representing like parts.

This invention relates to improvements in apparatus for preparing paper size, the object being to produce an emulsion from the resin size commonly used for sizing paper superior to the emulsion which is produced by the process and apparatus heretofore in use.

This application is a division of our prior co-pending application, Serial No. 816,860, filed February 5, 1914.

Resin size as it is commonly supplied to or prepared by the paper maker consists of a resin soap having resinate of soda as a base and containing besides water more or less free or unsaponified resin dissolved therein. At the mill it is customary to prepare an emulsion from this resin size by mixing it with water to form a fluid wherein particles of free resin are carried and held suspended.

As the process is commonly carried out, however, the emulsion is seldom perfect and the free resin tends to precipitate or separate out and form unsuspended particles. These unsuspended particles usually form in time large masses or accretions on the sides and bottom of the containing tanks necessitating frequent cleaning. If either the water or the size is not at a sufficiently high temperature when the two are brought together, this tendency of the resin to separate and agglomerate is intensified. The separation of the free resin is also found to take place if the emulsion is kept standing unless the latter, either when made or immediately after and before cooling, is greatly diluted so that the mixture as compared with the original emulsion represents a considerable bulk.

The free resin thus separated out makes the emulsion undesirable for use. Even if carefully strained, portions of it inevitably reach the paper and produce imperfections. Furthermore, even if the separated resin is completely strained out from the emulsion, the latter is rendered less efficient because the imperfect emulsification robs the size of the desired amount of free resin, which latter is a most important sizing factor in the size. The free resin owing to its tendency to cake or agglomerate must be removed from time to time, thus causing unnecessary labor and in aggravated or neglected cases even filling the pipes used in conducting the size emulsion, thus causing serious interference in the production of suitable paper by the complete or partial stoppage of the customary supply of size emulsion.

We have discovered that by subjecting the size to a suitably high temperature and simultaneously to a suitably high pressure and then, while so heated and under pressure, freeing it from these conditions of temperature and pressure, as by discharging it into water, a substantially perfect emulsion is produced with the free resin completely in suspension and the resulting emulsion can be kept indefinitely in relatively concentrated form without the appreciable separation of any of the free resin. The maintenance of the size under high pressure and temperature and the sudden release of that heat and pressure as the size is discharged into the water and the soap goes into solution appears to break up the thin stream of size into extremely fine particles or globules which are instantly dissolved and emulsified when coming in contact with water. We believe this to be due to the fact that the size becomes highly charged with energy under the conditions of heat and pressure referred to and that this stored up energy instantly vaporizes water contained in the size when the pressure is released thereby breaking up the thin stream of size into a vast number of minute particles of highly heated resinate of soda and free or unsaponified resin together with unvaporized water. These minute particles owing to the expansion of the vaporized water or steam become separated from each other and in this state are bodily projected into the water, the resinate of soda dissolving and the unsaponified or free resin instantly emulsifying. Whether this be the true explanation or not, a substantially perfect emulsion of higher sizing efficiency than heretofore can be produced and can be maintained indefinitely at a degree of concentration considerably greater than heretofore considered possible.

The invention will be best understood by reference to the following description when taken in connection with the accompanying illustration of one specific embodiment thereof, while its scope will be more particularly pointed out in the appended claims.

Figure 1 shows in partly diagrammatic arrangement one form of apparatus which is adapted to carry into effect our improved method; and Fig. 2 is a detail representing one form of nozzle that may be employed in the practice of our invention.

Referring to the drawing and to the embodiment of the invention therein shown, the apparatus is provided with a closed tank or other suitable receptacle 1 which is adapted to receive a suitable quantity of resin size 2 and to maintain the same under a suitable pressure, such by way of example, as one hundred pounds to the square inch.

The size may be introduced into the tank by gravity, or it may be drawn into the same by suction. For gravity filling, the tank is provided at its top with a size supply pipe 7 having the valve 8, and also with means to vent the top of the tank to the atmosphere, as for example, the air vent valve 6 in the pipe 3, which latter is also connected to the top of the tank. The vent 6 having been opened and the valve 8 opened, the size may be introduced directly through the pipe 7, the tank being preferably about one half filled with the size, so as to allow both for the expansion of the size when steam is applied thereto and to leave a steam space at the top of the tank. When the desired quantity of size has been entered into the tank, the valves 6 and 8 are both closed.

Any suitable means may be employed for raising the temperature and pressure of the size thus confined in the tank and such means may be either indirect, such as steam coils or jackets, or electrical or other similar heating devices, or direct such as gas flame or the like or, as herein, live steam introduced through the bottom or other portion of the tank. For this purpose the tank is provided at its bottom with a lower steam supply pipe 9 controlled by the valve 10 and connected to the main steam pipe 4 through the branch pipe 11 and the intermediate screen or filter 12. The branch pipe 11 is also provided with the valve 13. The pipe 4 is connected to any suitable source (not shown) which is adapted to maintain a steam supply under pressure.

By opening the valves 10 and 13, steam under pressure may be admitted to the bottom of the tank. As the steam enters the tank it strikes the size and passes through it to the upper part of the tank, agitating and thoroughly heating the size. The valves 10 and 13 are left open for a sufficient length of time to bring the entire body of size uniformly to the high temperature of the steam. In this condition, where it is under the same conditions of pressure and temperature as the steam, it is ready to be emulsified.

The amount of steam pressure required will vary according to the proportion of free resin in the size, a high percentage of free resin requiring a higher steam pressure than is necessary with a low percentage. The boiler pressure of one hundred pounds commonly obtainable in most mills has been found to answer the purpose in most cases, but lower pressures may be successfully used, particularly with size having a small percentage of free resin.

To discharge the heated size from the tank 1, any suitable means may be used, but herein live steam is applied to the top of the tank and the size expelled through the pipe 9, which latter is disconnected from the boiler pressure and connected to a water tank. For this purpose the pipe 3 is preferably connected to the live steam pipe 4 through the cut-off valve 5. The pipe 11 is also connected between the valve 13 and the filter 12 with the size delivery pipe 15 under the control of the valve 16. The delivery pipe leads to a suitable emulsion tank 14 wherein it is provided with a suitable discharge nozzle 17, preferably of such form that the size when discharged emerges in a thin or finely divided stream so that it may commingle with the water almost instantly. The nozzle 17 herein shown consists of a spherical shaped body provided with a plurality of thin, transverse slits shown in Fig. 2 and so arranged that the size is delivered therefrom in a number of radiating streams, each in the form of a thin ribbon. The end wall of the nozzle 17 wherein the slots or openings are provided constitutes a pressure-preserving obstruction, whereby the size emerging through said obstruction in a fine stream is suddenly relieved of high pressure and heat, and immediate emulsification is effected.

The tank 14 having been filled with water to a point above the nozzle 17, the water is preferably heated by any suitable means, such for example as the steam pipe 19 connected with the main steam pipe 4 and controlled by the valve 20. The heating of the water may be dispensed with and the size be discharged directly into cold water, particularly where the amount of free resin is small. We find it preferable, however, in most cases to heat the water somewhat before introducing the size.

When both the water and the size have been heated as described, the valve 13 is closed and the valves 5 and 16 opened, causing steam pressure to be applied directly to the top of the tank and forcing the size out through the bottom pipe 9, filter 12, branch pipe 11, delivery pipe 15 and through the nozzle 17 into the water of the tank 14. The size as it emerges at the nozzle in a fine stream being suddenly relieved of the high pressure and converted into a superheated spray which strikes the relatively low temperature water results in the instant formation of a substantially perfect emulsion. This process is continued until all the size has been discharged from the tank, a condition which will be readily apparent by the blowing out of steam at the discharge nozzle 17.

The amount of water required properly to emulsify a given amount of size will vary according to the amount of free resin with which the size is charged, and the present invention is not limited to any particular proportion of water employed in diluting the size. For example, in the common grades of size containing thirty per cent. or more of free resin we have found that a good emulsion can be obtained and kept by employing about nine parts of water to one part of size. That is to say, nine parts of water may be introduced into the tank 14 for every part of size contained in the tank 1 and the emulsion after being formed need not be further diluted. This is nearly three times the concentration which it is ordinarily practicable to secure by the process heretofore in use employing a similar size, and avoids the large bulky storage tanks heretofore required. It is practicable still further to concentrate the size and in the low free resin sizes for example, those containing less than thirty per cent. of free resin, the process may be carried out with a considerably lower proportion of water, while those containing less than twenty per cent. of free resin (dry basis) may be carried out with almost any proportion of water.

The filter 12 consists of an exterior cylinder or drum containing an interior cylinder or drum 21, the latter having a series of fine perforations 22, there being provided an annular space between the two cylinders. The outer cylinder communicates with the pipe 9 and the inner cylinder with the branch pipe 11, so that, as the size passes from the pipe 9 to the pipe 11, it is caused to pass through the cylindrical screen 21, any impurities or foreign particles remaining in the outer cylinder 12. To clean out the cylinder 12 from time to time the pipe 9 terminates beyond its connection to the filter in a discharge nozzle 24 controlled by a valve 23. By closing the valve 10 and opening the valves 13 and 23, from time to time, as may be required, the collected impurities will be discharged from the filter through the nozzle 24. The filter may be omitted if desired, although it is preferable to employ it or its equivalent in the case of sizes which have not been heretofore screened.

The size emulsion may be drawn off from the emulsion tank 14 through the pipe 25, either directly for use as required or to a storage tank or tanks.

Should it be required to charge the size tank 1 by suction, the valves 13 and 10 and the air vent 6 are opened, filling the tank with steam and expelling the air. The valves 13 and 6 are then closed, the tank allowed to cool and the steam condense, forming a vacuum. A receptacle 26 (shown in dotted lines) being filled with size and replaced with the nozzle 24 immersed therein, the size may be drawn into the tank through suction by opening the valve 23.

The described method of emulsifying the size may be carried on in any part of the mill or building irrespective of the location of the size tank with relation to the emulsion tank, thereby avoiding the use of pumping or conveying devices now quite commonly employed, the emulsion produced being of a higher order with a finer grain of suspended resin particles and capable of sizing a greater quantity of paper and may be stored with greater economy of space than that heretofore produced.

By confining the size in a closed tank or vessel wherein it may be maintained under pressure and heating the same therein, we are enabled to raise its temperature to a point in excess of 212° Fahrenheit, which has heretofore been the limiting temperature in heating size preparatory to emulsifying the same.

While for purposes of illustration we have herein described one specific form of apparatus, it is to be understood that the precise steps and conditions herein referred to and the specific mechanical details disclosed may be widely deviated from without departing from the spirit of the invention.

Claims:

1. In an apparatus for preparing resin size for paper manufacture, the combination with a closed, size-containing vessel having means whereby the size may be introduced into the same, means for applying heat and high pressure to the size while confined in the closed vessel, an emulsion container adapted to contain water, and means for forcing the size from the closed, size-containing vessel to the emulsion container including a submerged delivery outlet provided with a restricted discharge orifice whereby the size emerges therefrom in a fine stream suddenly relieved of high pressure and heat, and immediate emulsification is effected.

2. In an apparatus for preparing resin size for paper manufacture, the combination with a closed, size-containing vessel having means whereby the size may be introduced into the same, means for applying heat and high pressure to the size while confined in the closed vessel, an emulsion container adapted to contain water, and means for forcing the size from the closed, size-containing vessel to the emulsion container including a submerged delivery outlet within said emulsion container and provided with a restricted orifice, whereby the size emerges therefrom in a fine stream suddenly relieved of high pressure and heat, and immediate emulsification is effected.

3. In an apparatus for preparing resin size for paper manufacture, the combination with a closed, size-containing vessel having means whereby the size may be introduced into the same, means for applying heat and high pressure to the size while confined in the closed vessel, an emulsion container adapted to contain water, and means for forcing the size from the closed, size-containing vessel to the emulsion container including a submerged delivery outlet having a pressure-preserving obstruction provided with a restricted discharge orifice, whereby the size emerging through said obstruction in a fine stream is suddenly relieved of high pressure and heat, and immediate emulsification is effected.

4. In an apparatus for preparing resin size for paper manufacture, the combination with a closed, size-containing vessel having means whereby the size can be introduced into the same, a pipe connected to the top portion of the vessel, a pipe connected to the bottom portion of the vessel, means for introducing steam under pressure through either of said pipes at will, a container, a size-delivering pipe leading into said container and having a delivery outlet provided with a pressure-preserving obstruction having a restricted discharge orifice, whereby the size emerging through said obstruction in a fine stream is suddenly relieved of high pressure and heat, and immediate emulsification is effected.

5. In an apparatus for preparing resin size for paper manufacture, the combination with a closed size-containing vessel having means whereby size can be introduced into the same, pipes connected to the top of the vessel and to the bottom thereof, means for introducing steam under pressure through either of said pipes at will, a container, a size-delivery pipe leading to and within said container, means for connecting said delivery pipe to the bottom of said size containing vessel to cause the expulsion of the size therethrough, and a size-filtering device between the container and the size-containing vessel.

6. In an apparatus for preparing resin size for paper manufacture, the combination with a closed size containing vessel having means whereby the size may be introduced into the same, means for applying heat and high pressure to the size while confined in the closed vessel, an emulsion container adapted to contain water, and means for forcing the size from the closed size containing vessel to the emulsion container including a delivery outlet submerged in the contents of said emulsion container and composed of a spherically shaped body with a plurality of thin transverse slits thereby to effect the discharge of the size in radiating streams in the form of thin ribbons, whereby the size emerges from said spherically-shaped body in streams suddenly relieved of high pressure and heat, and immediate emulsification is effected.

7. In apparatus for preparing resin size for paper manufacture, the combination with a closed size-containing vessel having means whereby the size may be introduced into the same, means for applying heat and high pressure to the size while confined in the closed vessel, an emulsion container adapted to contain water and means for forcing the size from the closed size-containing vessel to the emulsion container including a submerged delivery outlet directly and immediately exposed to the water contents of said emulsion container and provided with a plurality of restricted orifices whereby the size emerges therefrom directly into the water in said emulsion container in fine streams suddenly relieved of high pressure and heat and immediate emulsification is effected.

8. In an apparatus for preparing resin size for paper manufacture the combination with a closed size-containing vessel having means whereby the size may be introduced into the same, means for applying heat to the size while confined in the closed vessel, steam pressure connections to said vessel whereby the size may be forcibly expelled therefrom, an emulsion container adapted to contain water, and connections from said size containing vessel and said emulsion container and including a delivery outlet within said emulsion chamber and submerged in the water contents thereof, said outlet being provided with a plurality of restricted orifices whereby the size is delivered therefrom in the form of thin ribbons suddenly relieved of high pressure and heat, and immediate emulsification is effected.

9. In an apparatus for preparing resin size for paper manufacture, the combination with a closed size-containing vessel 1 having means 7 whereby the size may be introduced into the same, means including steam pipe 9 for applying heat and high pressure to the size within said vessel, an open-topped emulsion container 14 adapted to contain water, means including a connection from said pipe 9 to said emulsion container 14 for forcing the size from the closed size-containing vessel 1 to said emulsion container 14, and including a delivery outlet 17 submerged within the water contents of said container 14 and having a plurality of restricted orifices 17', whereby the size emerges in fine streams suddenly relieved of high pressure and heat and immediate emulsification is effected.

10. In an apparatus for preparing resin size for paper manufacture, the combination with a closed size-containing vessel 1 having means whereby the size may be introduced into the same, means for applying heat and high pressure to the size while confined in said closed vessel 1, an open-mouthed emulsion container 14 adapted to contain water and means for forcing the size from the closed size-containing vessel 1 to said emulsion container 14 including a delivery outlet 17 submerged within the water contents of said container 14 and provided with a plurality of restricted discharge orifices 17' whereby the size emerges therefrom in fine streams suddenly relieved of high presure and heat and immediate emulsification is effected.

In testimony whereof, we have signed our names to this specification, in the presence of two subscribing witnesses.

BRUNO KNIFFLER.
WILLIAM A. OPPEN.

Witnesses:
ROBERT H. KAMMLER,
THOMAS B. BOOTH.